(12) United States Patent
Goldring et al.

(10) Patent No.: US 10,190,607 B2
(45) Date of Patent: Jan. 29, 2019

(54) COMPOSITE ACTUATOR PISTON HEAD ASSEMBLY

(71) Applicant: GOODRICH CORPORATION, Charlotte, NC (US)

(72) Inventors: Eric Goldring, Ontario (CA); Rony Ganis, Ontariio (CA)

(73) Assignee: Goodrich Corporation, Charlotte, NC (US)

(*) Notice: Subject to any disclaimer, the term of this patent is extended or adjusted under 35 U.S.C. 154(b) by 870 days.

(21) Appl. No.: 14/609,975

(22) Filed: Jan. 30, 2015

(65) Prior Publication Data
US 2016/0222993 A1 Aug. 4, 2016

(51) Int. Cl.
F15B 15/14 (2006.01)
B64C 25/22 (2006.01)

(52) U.S. Cl.
CPC .......... F15B 15/1457 (2013.01); B64C 25/22 (2013.01); F15B 15/1447 (2013.01); F15B 15/1452 (2013.01)

(58) Field of Classification Search
CPC .............. F15B 15/1457; F15B 15/1452; F15B 15/1447; B64C 25/22; F16B 39/126
See application file for complete search history.

(56) References Cited

U.S. PATENT DOCUMENTS

2010/0247266 A1* 9/2010 Staniszewski ........ F16B 39/126
411/201

FOREIGN PATENT DOCUMENTS

| DE | 102014013992 A1 | * | 3/2016 | .......... F15B 15/1447 |
|---|---|---|---|---|
| JP | 611703 | | 1/1986 | |
| JP | S611703 | * | 8/1986 | .............. F15B 15/14 |
| JP | 63214430 | | 9/1988 | |
| JP | 0626570 | | 2/1994 | |
| JP | 0681948 | | 3/1994 | |
| WO | 2007139384 | | 12/2007 | |

OTHER PUBLICATIONS

Extended European Search Report dated Jun. 20, 2016 in European Application No. 16153491.2.

* cited by examiner

Primary Examiner — Abiy Teka
(74) Attorney, Agent, or Firm — Snell & Wilmer L.L.P.

(57) ABSTRACT

The present disclosure describes composite actuator piston rods and methods for making such rods. Composite actuator piston rods of the present disclosure may include a tapered end and an embedded bolt positioned within the tapered end. A piston head may be secured to the embedded bolt by a nut. Further, a keyed locking cup washer and jam nut may further secure the piston head to the embedded bolt.

19 Claims, 3 Drawing Sheets

COMPOSITE ACTUATOR PISTON HEAD ASSEMBLY

FIELD

The present disclosure relates generally to actuators and more specifically to actuators having composite actuator piston tubes.

BACKGROUND

Conventionally, various types of aircraft utilize actuators including, for example, to deploy nose, body, and/or wheel landing gear systems. Conventional actuator components are made of metallic materials and often comprise complex geometries and high strengths. However, these metallic components are typically heavy.

SUMMARY

An actuator in accordance with various embodiments may comprise a composite actuator rod tube having a tapered end, an embedded bolt having a threaded end, and a nut configured to engage with the threaded end of the embedded bolt. The actuator may comprise a piston head concentrically surrounding the tapered end of the composite actuator rod tube. A locking cup washer may concentrically surround a portion of the threaded end of the embedded bolt. The locking cup washer may comprise a key configured to engage with a slot of the threaded end of the embedded bolt. A jam nut may be engaged with the threaded end of the embedded bolt proximate the locking cup washer. The piston head may comprise a sealing groove and/or a bearing groove. The embedded bolt may be positioned within and bonded to the tapered end of the composite actuator rod tube. The threaded end of the embedded bolt may comprise a flat segment.

A method for forming a composite actuator rod in accordance with various embodiments may comprise forming a composite actuator rod tube having a tapered end concentrically surrounding an embedded bolt, and bonding the embedded bolt to the tapered end. The embedded bolt may comprise a flat segment. The method may further comprise concentrically surrounding the tapered end with a piston head and securing it to the tapered end with a nut. The method may further comprise concentrically surrounding the threaded end of the embedded bolt with a locking cup washer comprising a key configured to engage with a slot of the threaded end of the embedded bolt. The method may further comprise engaging the threaded end of the embedded bolt with a jam nut and positioning the jam nut proximate the locking cup washer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

The present disclosure describes actuators having a composite actuator rod. Such actuators may be used in aircraft systems, such as, for example, landing gear systems. However, the systems and methods of the present disclosure may be suitable for use in non-aircraft systems as well.

Figure 1A:
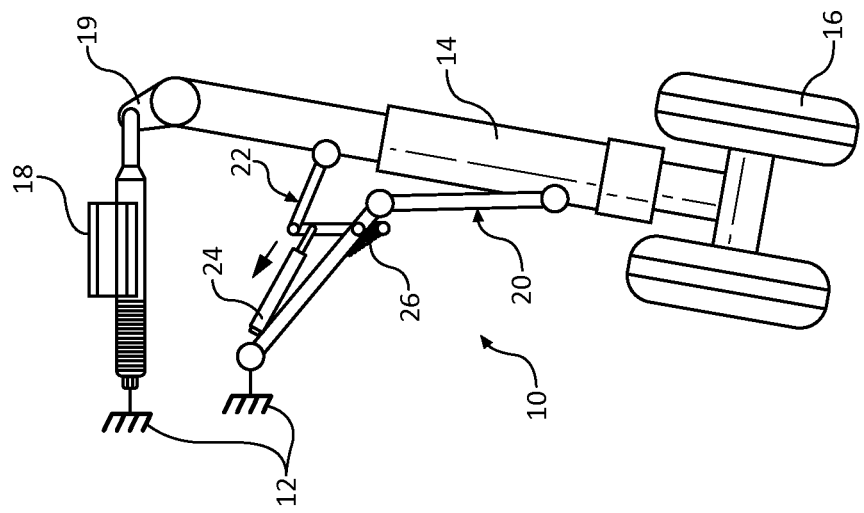
FIGS. 1A and 1B illustrate side views of a landing gear system in accordance with various embodiments.
Figure 1B:
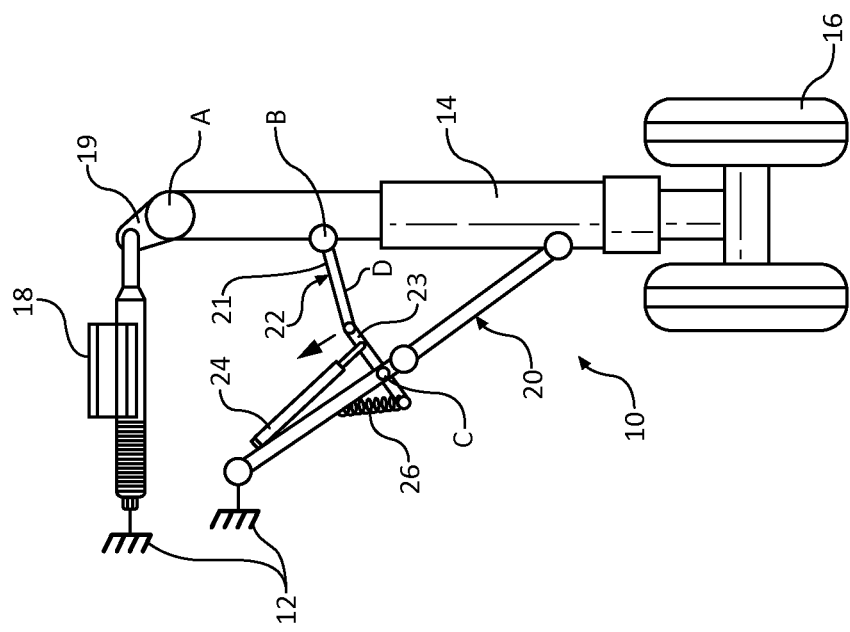

With initial reference to FIGS. 1A and 1B, a retraction sequence of a landing gear assembly 10 is illustrated. In various embodiments, landing gear 10 includes a strut 14 supporting wheels 16. Strut 14 is rotatable about a pivot, which is provided by an airframe 12, in response to an extend/retract actuator 18 applying a force to an arm 19. A linkage 20 may connect a lower portion of strut 14 to airframe 12, for example. A lock-stay 22 may be interconnected between linkage 20 and strut 14 to lock landing gear 10 in a deployed position until landing gear retraction is commanded.

In FIG. 1A, landing gear 10 is shown in the deployed position. The example lock-stay 22 includes first and second links 21, 23 pivotally secured to one another at a joint D. One end of first link 21 is connected to strut 14 at pivot B. A portion of second link 23 is connected to linkage 20 at pivot C. A biasing member 26 is arranged between lock-stay 22 and linkage 20 to bias lock-stay 22 to the locked position. An unlock actuator 24 is interconnected between linkage 20 and lock-stay 22 to pull joint D from over-center, as depicted by the arrow in FIG. 1B, so that extend/retract actuator 18 can move landing gear 10 to a stowed position.

Figure 2:
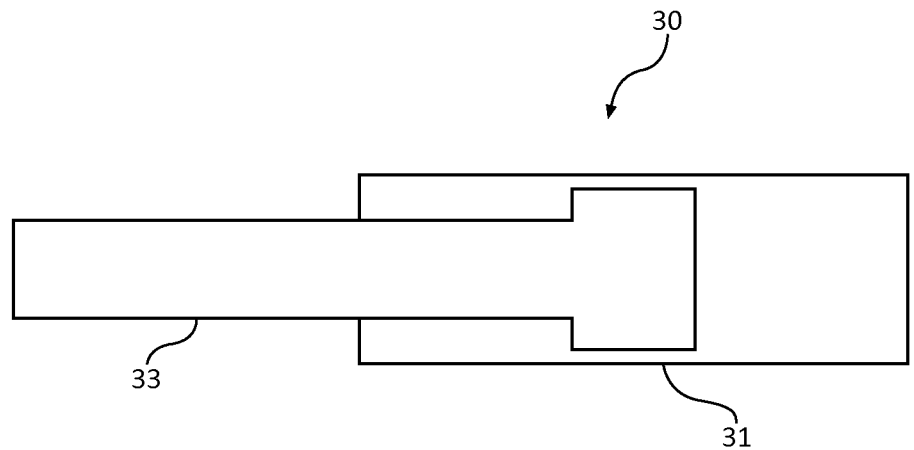
FIG. 2 illustrates a schematic view of an actuator in accordance with various embodiments.

With initial reference to FIG. 2, a schematic diagram of actuator 30 is illustrated. Actuator 30 may comprise, for example, an extend/retract actuator 18 or an unlock actuator 24 (as illustrated in FIGS. 1A and 1B), or any other type of actuator suitable for use in body-type landing gear systems. Further, actuator 30 may comprise an actuator suitable for use in other systems, including flight control systems, wing and nose landing gear systems, and any other system which utilizes one or more actuators, including non-aircraft systems. Actuator 30 may comprise an actuator body 31 into which a actuator rod tube 33 (also referred to as an actuator piston) retracts and extends. Actuator 30 may comprise, for example an extend/retract actuator 18 or an unlock actuator 24 (as illustrated in FIGS. 1A and 1B), or any other type of actuator suitable for use in body-type landing gear systems. Further, actuator 30 may comprise an actuator suitable for use in other systems, including flight control systems, wing and nose landing gear systems, and any other system which utilizes one or more actuators, including non-aircraft systems.

Figure 3A:
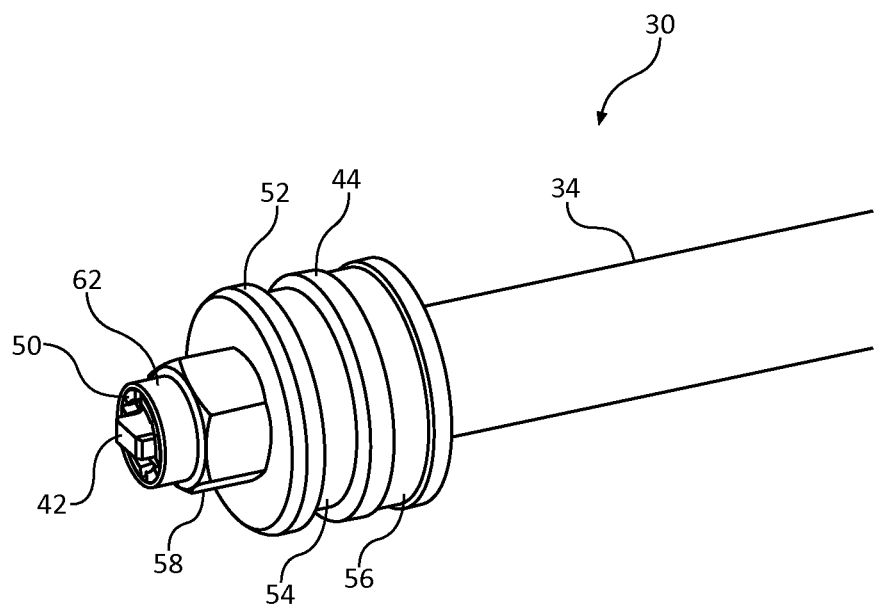
FIGS. 3A, 3B, and 3C illustrate, respectively, a perspective view, a cross-sectional view, and an exploded view of an actuator in accordance with various embodiments.
Figure 3B:
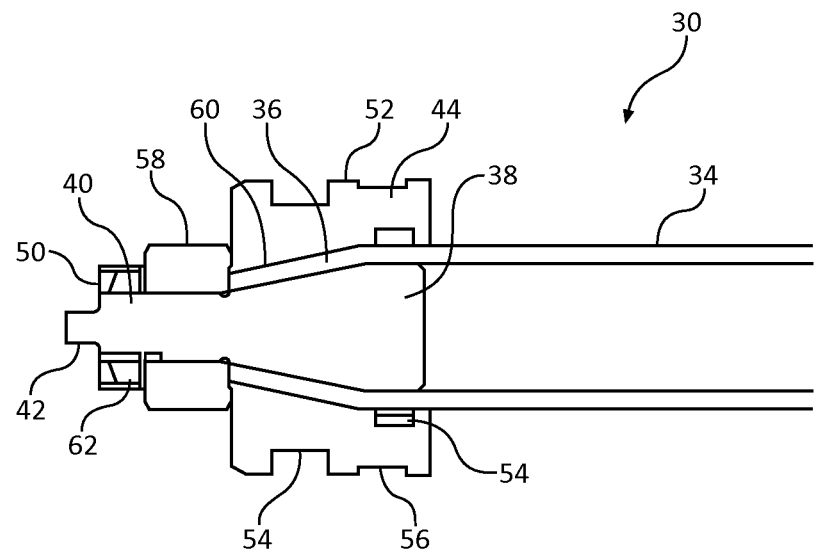
Figure 3C:
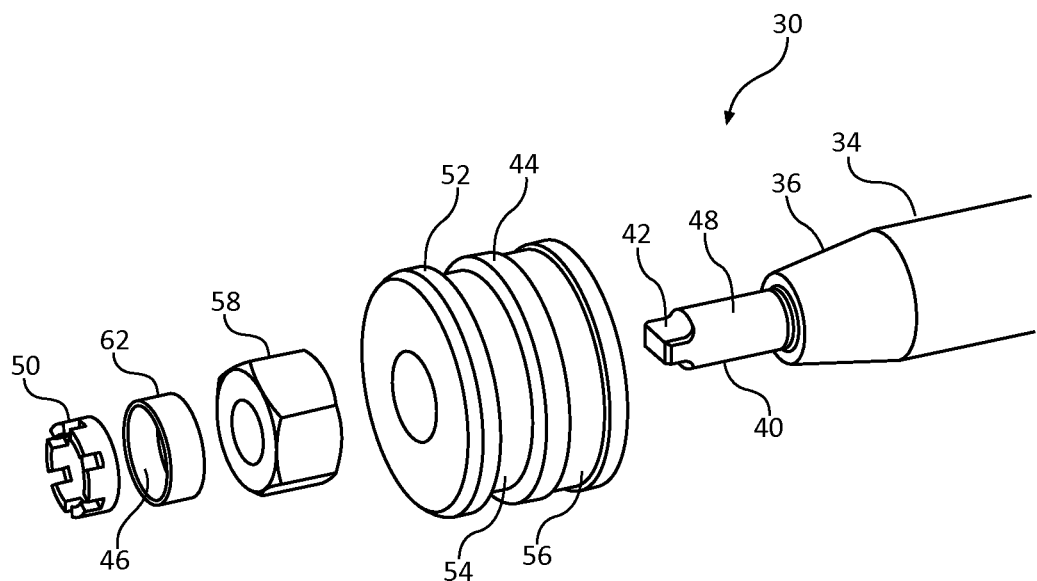

In various embodiments, with reference to FIGS. 3A-3B, actuator 30 comprises a composite actuator rod tube 34. Composite actuator rod tube 34 may comprise, for example, a lightweight polymer matrix composite such as a carbon fiber composite material or a hydrocarbon fiber composite material. Although composite materials provide reduced weight over traditional metal components, it may be difficult to couple composite materials to metal components. Conventional methods of attaching composite materials to other materials, such as threading or drilling holes in the composite material, may significantly reduce the strength of the composite material. Therefore, methods and apparatus for connecting composite material components (such as composite actuator rod tube 34) to other components (such as metallic components) may be desirable.

Composite actuator rod tube 34 may comprise a tapered end 36. In various embodiments, tapered end 36 is formed of a lightweight polymer matrix composite material. For example, tapered end 36 may comprise the same material as composite actuator rod tube 34. Tapered end 36 may be configured to provide a tapered surface to engage with a metal component of actuator 30. As will be discussed in greater detail, a metal component may be secured against and held within tapered end 36, eliminating the need for threading or drilling of tapered end 36 and/or actuator rod tube 34, which would reduce the strength of and/or compromise the structural integrity of actuator rod tube 34.

Composite actuator rod tube 34 and tapered end 36 may be formed by laying composite sheets or layers in a desired shape and bonding the layers together using resins, adhesives, or other bonding agents. In further embodiments, composite actuator rod tube 34 and tapered end 36 may be formed using a fiber-wound form, wherein fiber is continuously wound onto the form and bonded together using resins, adhesives, or other bonding agents. Any manner of forming composite actuator rod tube 34 and tapered end 36 is within the scope of the present disclosure.

During or after formation, tapered end 36 may pretensioned. For example, tapered end 36 may be pretensioned for tensile and/or compressive loads. Such pretensioning may reduce fretting and/or extend the fatigue life of tapered end 36.

In various embodiments, an embedded bolt 38 is positioned within tapered end 36. Embedded bolt 38 may comprise a conical bolt having a shape that is complementary to tapered end 36. As will be discussed in greater detail, embedded bolt may be positioned within tapered end 36 and held in tension by components located outside of actuator rod tube 34. In various embodiments, embedded bolt 38 may be placed within and bonded to tapered end 36 during formation of composite actuator rod tube 34 and tapered end 36. Embedded bolt 38 may comprise, for example, a metallic material. However, embedded bolt 38 may comprise any suitable material.

Embedded bolt 38 may comprise, for example, a threaded end 40. In various embodiments, threaded end 40 of embedded bolt 38 extends outward from and beyond tapered end 36 and is configured to receive one or more components capable of holding embedded bolt 38 in tension with tapered end 36. Embedded bolt 38 may further comprise a flat segment 42. In various embodiments, flat segment 42 may provide a location to hold stationary as one or more components are engaged to threaded end 40.

In various embodiments, a piston head 44 may concentrically surround and be secured to embedded bolt 38. For example, piston head 44 may be positioned concentrically around threaded end 40 and secured by a nut 58. Piston head 44 may comprise a metallic material. However, piston head 44 may comprise any suitable material.

Piston head 44 may comprise an inner profile 60 that is complementary to tapered end 36 and/or embedded bolt 38. Piston head 44 may comprise an outer surface 52 having one or more seal grooves 54. Further, outer surface 52 may comprise one or more bearing grooves 56.

In various embodiments, a locking mechanism may be used to assist in securing nut 58 to embedded bolt 38. For example, a locking cup washer 62 may be positioned surrounding threaded end 40 and proximate nut 58. In various embodiments, locking cup washer 62 may comprise a key 46 configured to engage with a slot 48 of threaded end. Further, a jam nut 50 may be positioned surrounding threaded end 40 and proximate locking cup washer 62 to secure locking cup washer 62 to threaded end 40. Other locking mechanisms may also be used to secure nut 58, including, for example, a locking tab washer.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An actuator comprising:
    a composite actuator rod tube having a tapered end;
    an embedded bolt having a threaded end, wherein the embedded bolt has a complementary shape to the tapered end;
    a nut configured to engage with the threaded end of the embedded bolt; and
    a piston head concentrically surrounding the tapered end of the composite actuator rod tube, wherein the composite actuator rod tube extends through the piston head and terminates at an interface between the nut and the piston head.

2. The actuator of claim 1, further comprising a locking mechanism proximate the nut.

3. The actuator of claim 2, wherein the locking mechanism comprises a locking cup washer concentrically surrounding a portion of the threaded end of the embedded bolt and a jam nut engaged with the threaded end of the embedded bolt and proximate the locking cup washer.

4. The actuator of claim 3, wherein the locking cup washer comprises a key configured to engage with a slot of the threaded end of the embedded bolt.

5. The actuator of claim 2, wherein at least a portion of the nut is disposed between the piston head and the locking mechanism.

6. The actuator of claim 1, wherein the piston head comprises a sealing groove.

7. The actuator of claim 1, wherein the embedded bolt is bonded to the tapered end of the composite actuator rod tube.

8. The actuator of claim 1, wherein the threaded end of the embedded bolt comprises a flat segment.

9. The actuator of claim 1, wherein an outer surface of the piston head comprises a bearing groove.

10. The actuator of claim 1, wherein a first sidewall of the nut is compressed against a second sidewall of the piston head at the interface.

11. The actuator of claim 10, wherein the first sidewall and the second sidewall or oriented substantially orthogonal with respect to a longitudinal axis of the composite actuator rod.

12. The actuator of claim 1, wherein the tapered end extends only within the piston head.

13. The actuator of claim 1, wherein the nut abuts the piston head.

14. The actuator of claim 1, wherein the composite actuator rod tube and the tapered end of the composite actuator rod tube are a single part.

15. A method for forming an actuator comprising:
    forming a composite actuator rod tube having a tapered end concentrically surrounding an embedded bolt having a threaded end and a complementary shape to the tapered end; and
    bonding the tapered end to the embedded bolt,
    concentrically surrounding the tapered end with a piston head; and
    securing the piston head to the tapered end with a nut;
    wherein the composite actuator rod tube extends through the piston head and terminates at an interface between the nut and the piston head.

16. The method of claim 15, wherein the embedded bolt comprises a flat segment.

17. The method of claim 15, further comprising concentrically surrounding the threaded end with a locking mechanism proximate the nut.

18. The method of claim 17, wherein the locking mechanism comprises a locking cup washer concentrically surrounding the threaded end of the embedded bolt and a jam nut proximate the locking cup washer.

19. The method of claim 18, wherein the locking cup washer comprises a key configured to engage with a slot of the threaded end of the embedded bolt.

* * * * *